United States Patent [19]
DoLoreto

[11] 3,908,214
[45] Sept. 30, 1975

[54] SELF-LOCKING THREADED INSERT AND METHOD OF MAKING SAME

[76] Inventor: Edward DoLoreto, 10402 Rives Rd., Downey, Calif. 90241

[22] Filed: Feb. 10, 1975

[21] Appl. No.: 548,837

Related U.S. Application Data

[63] Continuation of Ser. No. 388,304, Aug. 17, 1973.

[52] U.S. Cl. .................................. 10/86 R; 151/23
[51] Int. Cl.² .......................................... B21D 53/24
[58] Field of Search .............. 10/10 R, 72 R, 86 R; 151/23, 41.73

[56] References Cited
UNITED STATES PATENTS

| | | |
|---|---|---|
| 2,783,811 | 3/1957 | Cummaro .......................... 151/41.73 |
| 3,130,765 | 4/1964 | Neuschotz ............................ 151/23 |
| 3,179,144 | 4/1965 | Brown .............................. 151/41.73 |
| 3,404,415 | 10/1968 | Rosan et al. ........................ 10/86 R |
| 3,667,526 | 6/1972 | Neuschotz ............................ 151/23 |

Primary Examiner—C. W. Lanham
Assistant Examiner—E. M. Combs
Attorney, Agent, or Firm—Dominick Nardelli

[57] ABSTRACT

An insert is disclosed capable of being screwed into a member to provide a stronger anchor for a fastener such as a bolt. The insert has a cylindrical body with external threads and, at one end thereof, there is integrally formed a locking means in the form of a coaxial ring extending from and connected to the body by two diametrically opposed struts. On the body are formed two axially parallel surfaces, each of which is aligned with one of the respective struts. This allows one, after the body of the insert is screwed into a tapped hole formed in the member, with the locking means protruding from the hole, by a sharp hammer blow placed on a ring to sheer the struts from the body whereby imbedding themselves in the void formed between the parallel surfaces and the member.

4 Claims, 5 Drawing Figures

U.S. Patent  Sept. 30, 1975  3,908,214
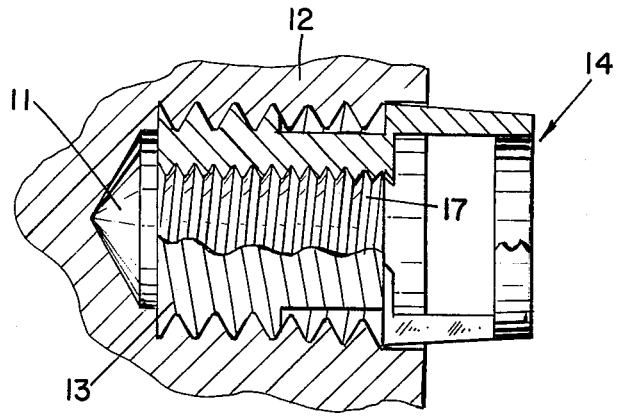
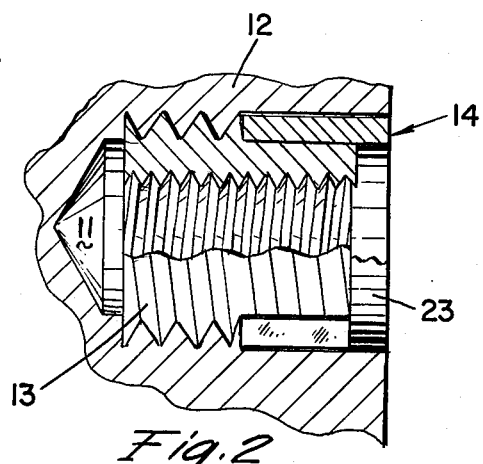
Fig. 1
Fig. 2
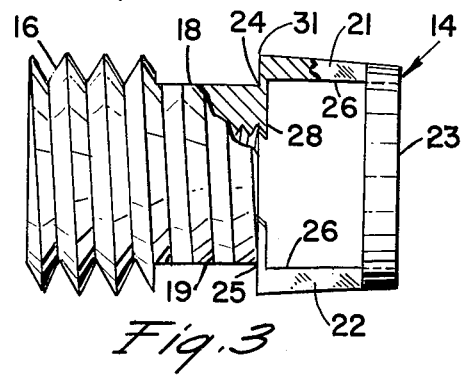
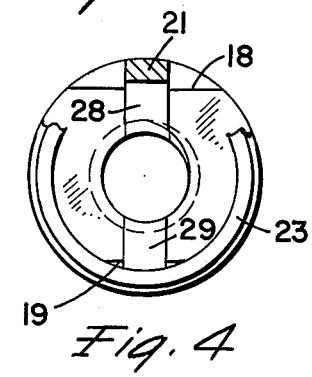
Fig. 3
Fig. 4
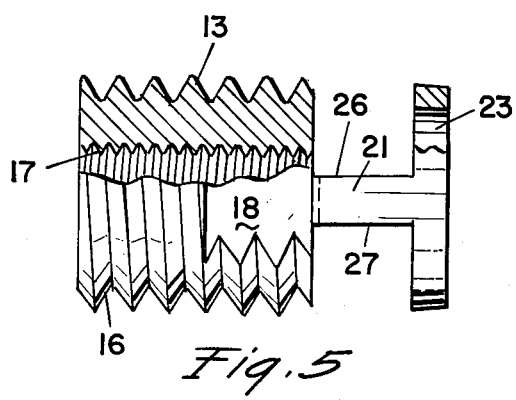
Fig. 5

SELF-LOCKING THREADED INSERT AND METHOD OF MAKING SAME

FIELD OF THE INVENTION

This invention relates to an insert, for example, as used in castings, to provide a strong, durable anchor for a bolt, and more particularly to a self-locking insert. This application is a continuation of my copending patent application Ser. No. 388,304 filed Aug. 17, 1973.

BACKGROUND OF THE INVENTION

Often, when a tapped hole is formed in a casting, for example aluminum, the threads become stripped when a bolt is too highly torqued therein. For this reason, inserts have been developed. A common insert of the prior art has a cylindrical body with internal and external threads, so that, after drilling and retapping the stripped hole, the insert is screwed therein. The bolt can now be screwed into the internal threads of the insert. Inserts provide an advantage in that the new tapped hole, being larger, provides stronger threads than the previous tapped hole. The reasons for this are that the new tap hole has a larger diameter and inherently deeper threads, and that the insert, being made of a stronger material than the casting, has inherently stronger internal threads. These inserts, being screwed into place, have to be locked or fixed into the casting so that the insert does not become disengaged every time the bolt is being removed or screwed into place.

OBJECTS OF THE INVENTION

An object of this invention is to provide a simple, relatively small sized economical self-locking insert.

Another object of this invention is to provide an insert, with the locking means formed integrally therewith.

Another object is to provide an insert that can be made entirely and automatically by a standard screw machine.

These and other objects and features of advantage will become more apparent after studying the following description of the preferred embodiment of my invention, together with the appended drawing.

BRIEF DESCRIPTION OF THE DRAWING

FIG. 1 is a cross-section of a tapped hole formed in a casting member with my novel insert screwed therein.

FIG. 2 is a similar view as FIG. 1, with the locking means securing the insert in place.

FIG. 3 is an axial parallel view of the insert of FIG. 1 before being inserted into the casting.

FIG. 4 is an end view thereof, in partial section.

FIG. 5 is another axial parallel view, taken at 90° to the view of the FIG. 3.

DETAILED DESCRIPTION OF THE DRAWING

Referring to FIG. 1, my novel insert is shown immediately after being threaded into a tap hole 11, formed in a member 12, made up, for example, cast aluminum. The insert has a cylindrical body 13, with a locking means 14 formed integral therewith. After the insert is threaded sufficiently into the tapped hole, it is locked in place by striking an axially aligned hammer blow on the locking means 14, driving the means into the member 12 as shown in FIG. 2.

Referring to FIGS. 3, 4, and 5, the preferred embodiment of my novel insert will now be described. As mentioned, the insert has a cylindrical body 13, with external threads 16, and internal threads 17. The insert has two parallel surfaces 18 and 19 made by milling a portion of the external threads 16, substantially as shown. The locking means 14 includes, extending axially from the body and integral therewith, two struts 21 and 22, oppositely disposed about the axis as shown. To the other end of the struts 21 and 22, a ring 23 is made integral therewith. The struts 21 and 22 are connected to the body 13 by sheer sections 24 and 25 respectively, that are, for example, .005 inch wide in the axial direction. The size of the insert shown is about five-eighths inch long and three-eights inch in diameter, overall, but inserts of larger and smaller sizes can be made that include the new and useful features and provide the new and useful result as disclosed herein.

One of the novel features of this invention is that the locking means 14 is made integral with the body. Therefore, the insert is preferably made in the following manner: A piece of round stock of suitable length and made of suitable material, such as steel, and having the required diameter has formed at one end the external threads 16, substantially up to where the end of the struts 21 and 22 are to be located. The center is drilled and tapped, providing the internal threads 17. The stock is counter-bored from the other end, opposite the external threads, whereby the diameter of the counter-bore is slightly more than the root diameter of the external threads. Both surfaces 18 and 19 are milled so that the distances therebetween is slightly less than the root diameter of the external threads, and are equally spaced from the axis. The axially length of these surfaces is substantially equal to the designed axial length of the struts 21 and 22, respectively. The axial spacing between the ends of the surfaces 18 and 19 and the bottom of the counter-bore is, for example, 0.005 inch to form the width of the sheer sections 24 and 25. Next, the struts 21 and 22 are formed by milling radially inward from opposite sides of the insert, two more parallel surfaces 26 and 27, which are disposed at right angles to surfaces 18 and 19. Surfaces 26 and 27 preferably start where surfaces 18 and 19 end and extend to and form the ring 23, thereby forming radial ribs 28 and 29. Surfaces 26 and 27 may overlap with surfaces 18 and 19. The surfaces 26 and 27 are separated, for example, 0.075 inch, thereby forming the sheer sections 24 and 25 that are each, for example, 0.075 inch by 0.005 inch. Therefore, when the axial blow is struck, the locking means 14 breaks off from the body 13 at the sheer sections and penetrate the tap hole 11 and member 12. In order for the struts to dig into the internal threads in the hole 11, a sharp edge 31 is formed on each strut.

Having described the preferred embodiment of my invention, one skilled in the art, after reading the above disclosure, can devise other embodiments without departing from the scope and spirit of my invention. Therefore, my invention is not to be considered limited to the embodiments described, but includes all embodiments falling within the scope of the claims.

I claim:

1. A method of forming an insert of the type described comprising the steps of:
   forming external threads on a cylindrical member extending to one end thereof, and terminating at a spaced distance from said other end;
   counter-boring a fixed distance from said other end;

milling a first pair of oppositely disposed and axially parallel surfaces on said body, which surfaces are substantially equally spaced from said axis, start from said other end at a distance that is slightly greater than said fixed distance, and extend toward said other end, and which surfaces are spaced apart a distance that is slightly less than the diameter of said counter-bore; and milling a second pair of oppositely disposed flat surfaces which are oriented at right angles to said first pair, and start substantially at the axial position of said first pair, and extend to said other end.

2. The method of claim 1 wherein said second pair of surfaces are spaced from said other end to form a ring.

3. The method of claim 2 wherein the distance between said first pair of flat surfaces is substantially equal to the root diameter of said external threads.

4. The method of claim 3 wherein said first pair of surfaces slightly overlap with said second pair of surfaces.

* * * * *